Nov. 2, 1948.   O. SCHILD   2,452,958
SYNCHRONOUS ELECTRIC MOTOR WITH AUTOMATIC STARTER
Filed Dec. 17, 1946
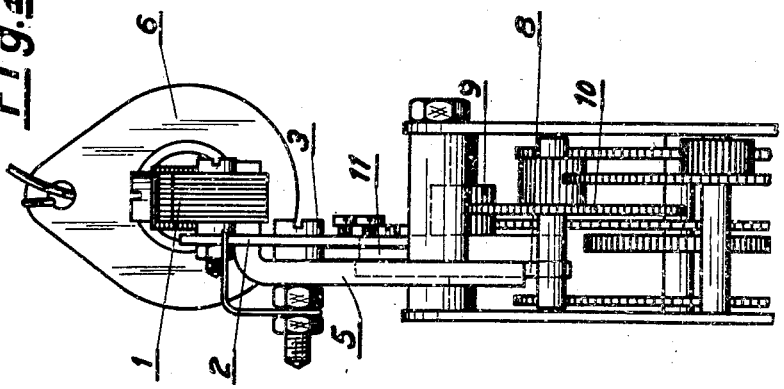
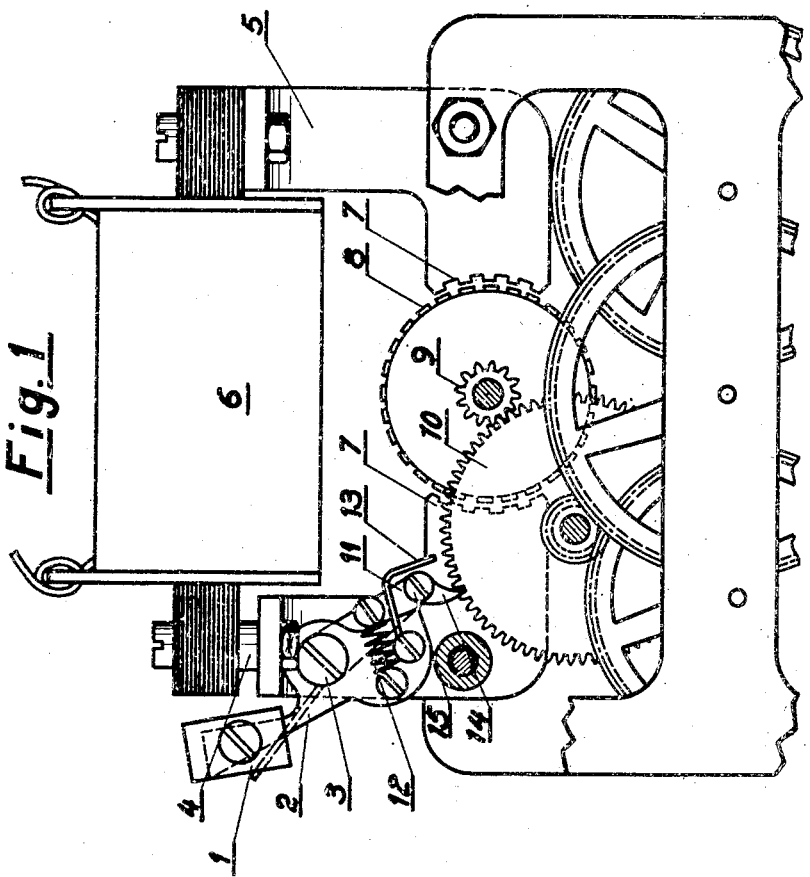
INVENTOR
Otto Schild
By Robert E. Burns
ATTORNEY Patented Nov. 2, 1948

2,452,958

UNITED STATES PATENT OFFICE 2,452,958

SYNCHRONOUS ELECTRIC MOTOR WITH AUTOMATIC STARTER

Otto Schild, La Chaux-de-Fonds, Switzerland

Application December 17, 1946, Serial No. 716,826
In Switzerland October 21, 1946

2 Claims. (Cl. 172—279)

The object of the present invention is a synchronous electric motor with automatic starter.

This starter is characterized by a stator magnetic circuit presenting an air gap, by a movable armature cooperating with this air gap, by a gear meshing with a pinion fixed at the shaft end of the rotor, and by a pawl linked with the movable armature and cooperating with said gear in such a way as to start the motor as soon as it is put under tension.

The attached drawing represents by way of example an embodiment of the invention.

Fig. 1 is an elevation view thereof.

Fig. 2 is a side-view.

In the embodiment shown, the starter comprises a movable armature 1 mounted on a lever 2 pivoted in 3 so as to be apt to move and bridge an air gap 4 provided in the magnetic circuit 5 of the stator of the synchronous motor. The latter carries a field coil 6 and comprises two toothed poles 7 cooperating with a toothed rotor 8. The shaft of the rotor carries a pinion 9 meshing with a first gear 10 of a clock work partially shown.

The pivot 3 carries a second lever 11 linked with lever 2 by a spring 12 whose elongation is limited by a stop 13. At the end of lever 11 is mounted a pawl 14 pivoted in 15 and cooperating with the teeth of gear 10.

The operation of this starter is as follows:

When current is sent through the coil 6, the magnetic flux draws the armature 1 and the lever 2 pulls lever 11 through the action of spring 12 and stop 13. The gear 10 thus receives from pawl 14 an impulse without knock which gives the motor a speed which is sufficient for starting it.

When the current is accidentally cut out, the motor will be automatically re-started in the same way as soon as the current is re-established; this is a great advantage over the manual starters, considering the frequent short interruptions that occur on networks.

What I claim is:

1. In a synchronous electric motor with automatic starter, in particular for clockworks, a frame, a rotor mounted rotatively in said frame, a driving pinion centered on said rotor, a first driven gear mounted rotatively in said frame, in mesh with said pinion, two pole pieces of unequal lengths secured on said frame in space relation with said rotor, a yoke bridging said pole pieces and secured thereon, a non-magnetic spacer inserted between said yoke and the shorter one of said pole pieces, in order to produce a gap across the entire section of the main magnetic flux path, a magnetic armature mounted pivotally on said shorter pole piece in such a way as to be apt to bridge said gap and thereby restore the entire section of the main magnetic flux path, and operative means of transmission of movement between said armature and said first driven gear.

2. In a synchronous electric motor with automatic starter, in particular for clockworks, a frame, a rotor mounted rotatively in said frame, a driving pinion centered on said rotor, a first driven gear mounted rotatively in said frame, in mesh with said pinion, two pole pieces of unequal lengths secured on said frame in space relation with said rotor, a yoke bridging said pole pieces and secured thereon, a non-magnetic spacer inserted between said yoke and the shorter one of said pole pieces, in order to produce a gap across the entire section of the main magnetic flux path, a magnetic armature mounted pivotally on said shorter pole piece in such a way as to be apt to bridge said gap and thereby restore the entire section of the main magnetic flux path, and operative means of transmission of movement between said armature and said first driven gear, said means comprising a lever mounted pivotally on said shorter pole piece on the same fulcrum as said armature, a linking spring between said lever and said armature, and a pawl mounted pivotally at the free end of said lever and engaging the teeth of said first driven gear.

SCHILD, OTTO.

REFERENCES CITED

The following references are of record in the file of this patent:

UNITED STATES PATENTS

| Number | Name | Date |
|---|---|---|
| 1,895,637 | Meissner | Jan. 31, 1933 |
| 2,027,944 | Whitehead | Jan. 14, 1936 |